United States Patent [19]
Bark et al.

[11] Patent Number: 5,322,322
[45] Date of Patent: Jun. 21, 1994

[54] SIDE IMPACT HEAD STRIKE PROTECTION SYSTEM

[75] Inventors: Lindley W. Bark, Chandler; Gershon Yaniv, Scottsdale; David J. Romeo, Fountain Hills; Gregory A. Mowry, Tempe, all of Ariz.

[73] Assignee: Simula Inc., Phoenix, Ariz.

[21] Appl. No.: 19,655

[22] Filed: Feb. 19, 1993

[51] Int. Cl.$^5$ .............................. B60R 21/22
[52] U.S. Cl. .................. 280/730; 280/728 R; 280/728 A; 280/729; 280/753
[58] Field of Search ............ 280/728 R, 728 A, 729, 280/730 A, 730 R;743 R, 743 A, 751 R, 749, 748, 753

[56] References Cited

U.S. PATENT DOCUMENTS

| 3,687,485 | 8/1972 | Campbell | 280/749 |
| 3,844,581 | 10/1974 | Fox | 280/751 |
| 3,953,049 | 4/1976 | Surace et al. | 280/749 |

FOREIGN PATENT DOCUMENTS

| 3-276844 | 12/1991 | Japan | 280/730 A |
| 2191450 | 12/1987 | United Kingdom | 280/730 R |
| 9011914 | 10/1990 | World Int. Prop. O. | 280/728 R |

Primary Examiner—Eric Culbreth
Attorney, Agent, or Firm—Kirkland & Ellis

[57] ABSTRACT

The present invention is a tubular structure which inflates upon side or oblique impact to protect the occupants of a vehicle such as an automobile. The structure is mounted in its undeployed state along the periphery of the vehicle's window. The primary component of the present invention is a braided tube containing a gas generator. When a side impact is detected, the gas generator is ignited, inflating the braided tube. As the braided tube inflates, the diameter of the tube increases and its length decreases. The tube then pulls out of its storage location and forms a taut, semi-rigid structural member across the vehicle's window.

26 Claims, 5 Drawing Sheets

SIDE IMPACT HEAD STRIKE PROTECTION SYSTEM

BACKGROUND

1. Field of the Invention

The present invention relates to safety apparatus for protecting the head and neck of the occupant of a motor vehicle to reduce the extent and severity of injuries sustained during a side impact crash. More specifically, it relates to a system of components that inflate to cushion the head and neck from direct impact with the interior structure of the vehicle.

2. Background of the Invention

Side or lateral impacts are a leading cause of injuries and fatalities in automotive crashes. According to the Insurance Institute for Highway Safety (IIHS), 30 percent of all automobile occupant fatalities in the United States in 1989 involved side impact crashes.

Occupants killed in side impact crashes typically have a high incidence of head and neck injuries. Side impact crashes also cause severe injuries to other body regions including the chest, abdomen, pelvis and extremities. FIG. 1 summarizes the distribution of injuries by body region, based on an IIHS study of 91 struck-side and 49 opposite-side fatalities in the United Kingdom in 1985. FIG. 1 shows the distribution of greater than 3 on the Abbreviated Injury Scale (AIS) by body region for fatalities in struck-side and opposite-side crashes. "Struck-side" refers to occupants seated on the side of the vehicle that was struck, while "opposite-side" refers to occupants who were seated on the side that was not struck. According to the IIHS study, 64% of struck-side occupants suffered head injuries; 12% suffered neck injuries; 85% suffered chest injuries; 26% suffered pelvis injuries; 2% suffered injuries to their upper limbs and 21% to their lower limbs; and 59% suffered abdomen injuries. FIG. 1 also shows that 82% of opposite-side occupants suffered head injuries; 20% suffered neck injuries; 73% suffered chest injuries; 14% suffered pelvis injuries; 10% suffered injuries to their upper limbs and 12% suffered injuries to their lower limbs; and 49% suffered abdomen injuries. FIG. 1 shows that serious head and neck injuries can occur in either seating position.

Conventional automotive safety belt and air bag systems offer inadequate protection to the head and neck in side impact crashes. These systems are generally designed to protect occupants from primary injuries sustained only in frontal impacts, or in oblique impacts up to approximately +/−30 degrees.

Federal Motor Vehicle Safety Standard (FMVSS) 214 currently defines the test procedures and performance requirements for occupant protection in side impact crashes. The dynamic requirements of FMVSS 214 are scheduled to be phased into practice based on an escalating percentage of each manufacturer's annual production starting Sep. 1, 1993.

In response to FMVSS 214, several developments in side impact countermeasures have occurred. These countermeasures primarily include the reinforcement of side components and door structures with improved door beams, modified pillars, and improved energy-absorbing door padding.

All of these developments in response to FMVSS 214 focus on limiting the intrusion of an object into the passenger compartment. Additionally, energy-absorbing padding helps distribute the impact force to the struck-side occupant over a larger surface area. An excellent production example of these technologies is the side impact protection system incorporated into current Volvo automobiles which carries door beam loads through the front seats into a center tunnel structure.

Another countermeasure recently being considered by several vehicle manufacturers are air bags that deploy from the door panel to provide protection for the thorax, abdomen and pelvic regions. These systems help distribute the impact force over a larger body surface area to reduce the extent and severity of injuries sustained during a side impact crash. However, these systems are not expected to provide significant protection to the head, face and neck. Therefore, as increasing numbers of vehicles are equipped with these countermeasures, head injuries will likely emerge as the predominant injury in all side impact crashes.

There are three major causes of head, neck, and face injuries in side impact crashes:

(1) The head and neck regions strike the upper interior side components of the vehicle. These components include the upper door frame, the A and B-pillars, the roof rail and the upper door frame. FIG. 2 shows the relative positions of A-pillar 20, B-pillar 21, roof rail 23, and upper door frame 25.

(2) The head and neck regions collide with the striking (or struck) object.

(3) The head flailing through the window frame. Typically, the side window is shattered early in the impact, and is therefore not a strike hazard. However, the head of the occupant is not restrained inside the passenger compartment. Moreover, the window cannot be used as a load bearing surface for a conventional type of air bag.

In light of these potential dangers, an effective side impact head and neck protection system must prevent or cushion the head from directly colliding with the upper side components of a vehicle, cushion or prevent the head and neck from directly being impacted by the striking or struck object, and restrain the head inside the confines of the vehicle.

SUMMARY OF THE INVENTION

The present invention comprises a system of inflatable structural component(s) integrated into a vehicle in the region of the vehicle's A and B-pillars and roof rail. The present invention can be installed during manufacture, or retrofitted into most in-service vehicles. It is intended to be used in addition to conventional automotive safety belts.

The primary component of the invention is an inflatable tubular structure that inflates upon side or oblique impact to become an additional structural member of the vehicle. The tubular structure extends diagonally from the A pillar to (or just behind) the B-pillar spanning the side window opening. Depending upon the geometry of the vehicle, the system can employ either a single or a double tubular structure.

In the undeployed position, the tubular structure is stowed in the A-Pillar, roof rail, and B--pillar areas. Pivotable mounts are used to attach one end of the structure to the B-pillar (or to the roof rail, slightly aft of the B-pillar) and the other end to the A-pillar. The tube is made of a durable, elastomer-impregnated braid that is impervious to gas. As the woven tube inflates, the diameter of the tube increases while its length decreases significantly. As the length of the inflating structure contracts, the mounts pivot inward toward the window opening. This allows the inflated tubular structure to pull out of its storage location and form an essentially straight line between its two anchor points. The tubular structure thereby forms a taut, semi-rigid structural member across the window opening.

The inflatable tubular structure is connected to a crash sensor(s). When a collision occurs, the crash sensor sends a signal to the gas generator, igniting the generator propellant, and thus inflating the tubular structure. The gas generator is integrated into the tubular structure and may be connected at any point along or within the structure's inflatable chamber.

As the generated gas inflates the tubular structure, it deploys or pulls out from its stowed position. When fully inflated, the tubular structure provides side impact strike protection for the head, neck and face, and prevents the head from flailing outside. The system may additionally help prevent unrestrained occupant ejection and provide head and neck protection in oblique impact crashes and in rollover accidents.

The inflatable tubular structure is not an air bag in the conventional sense. It operates at pressures much higher than the pressures used in conventional air bags, it is not vented after deployment, and it retains its position and rigidity through tensile forces. Even after the gas has cooled, the structure remains sufficiently inflated to provide continuous protection for possible additional impacts during an accident. Because it retains its rigidity and position through tensile forces, it does not require a bearing surface. It also does not require a storage cover, and does not need to be multiply folded in the undeployed state.

The primary function of the tubular structure is to prevent the occupant's head and neck from colliding with interior vehicle components (e.g., the A and B-pillars, or the roof rail). The structure also cushions the impact between the occupant's head and the striking or struck object, and serves as a structural barrier limiting the intrusion of the striking or struck object into the passenger compartment through the window. The tubular structure also prevents the occupant's head from flailing through the window and may additionally prevent the ejection of an unrestrained occupant.

Accordingly, it is an object of the present invention to provide protective apparatus, used in conjunction with conventional safety belts, that inflates to protect the head and neck of an occupant of a vehicle in a side impact crash.

It is another object of the present invention to provide an inflatable structural member that restrains the occupant from flailing through, or being ejected from, the window.

It is another object of the present invention to provide an inflatable structural member that helps prevent the struck or striking object from entering the vehicle through the side window opening.

It is another object of the present invention to provide a system of inflatable components that are not vented and are at high pressure to provide continuous protection for possible additional impacts during an accident.

It is another object of the present invention to provide a system of inflatable components integrated into the vehicle body, providing uninhibited entry, exit, and operation of the vehicle.

These and other objects of the present invention are described in greater detail in the detailed description, the appended drawings, and the attached claims.

DETAILED DESCRIPTION OF THE INVENTION

Figure 1:
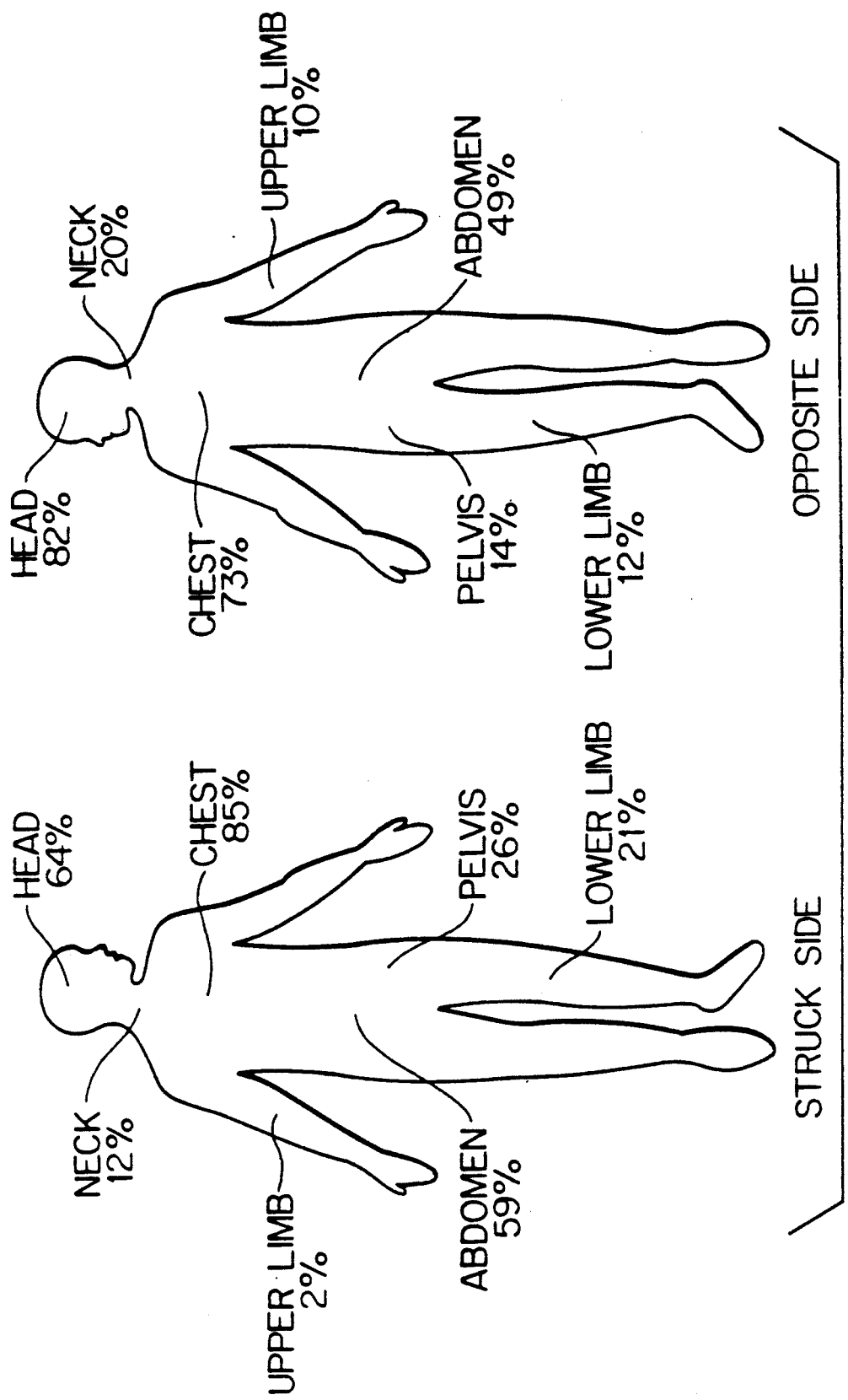
FIG. 1 shows the distribution of injuries by body region for struck side and opposite side crashes using the Abbreviated Injury Scale (AIS).
Figure 2:
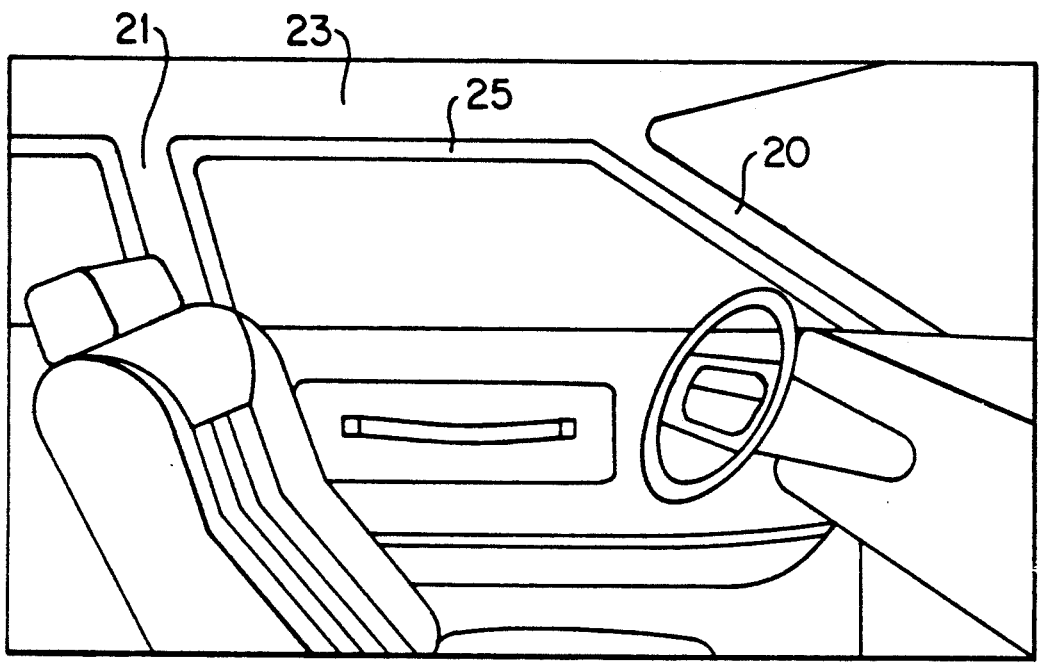
FIG. 2 shows a partial side view of the interior of a typical automobile.
Figure 3A:
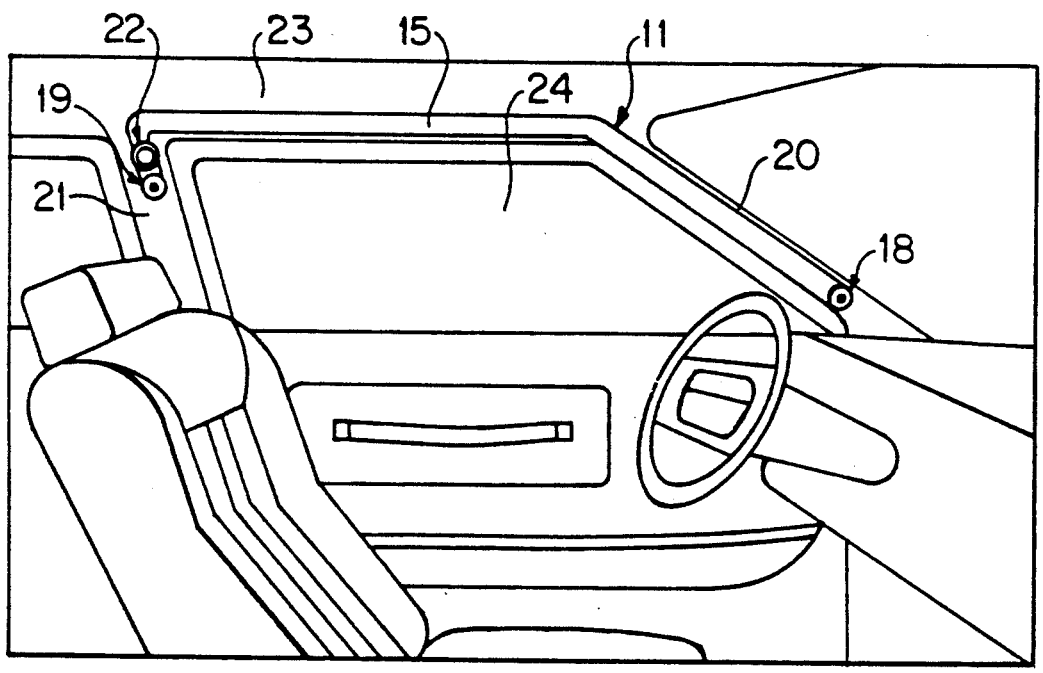
FIG. 3a shows the present invention in the undeployed configuration installed in a typical automobile.
Figure 3B:
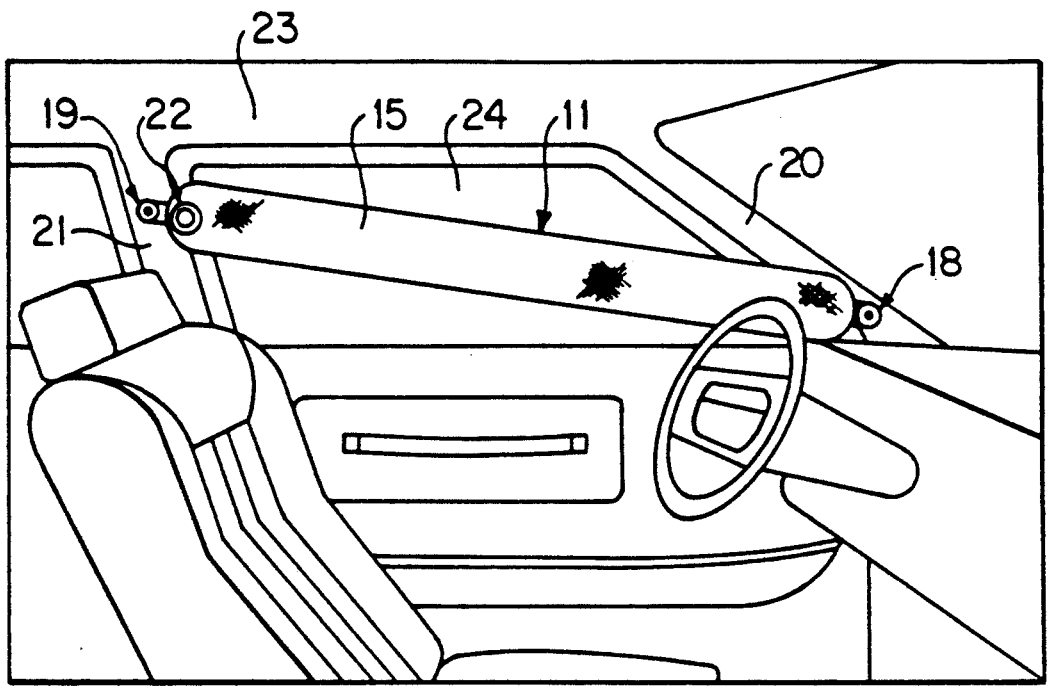
FIG. 3b shows a first preferred embodiment of the present invention after deployment.
Figure 3C:
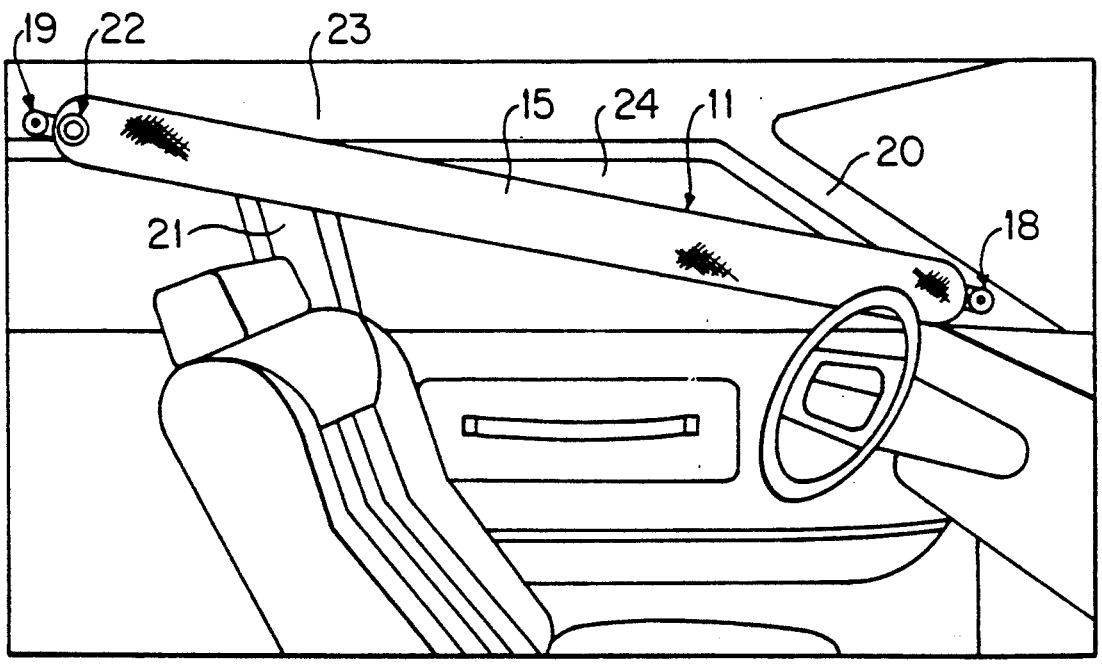
FIG. 3c shows a an alternate position for the tubular structure of the present invention after deployment.

The first preferred embodiment of the present invention is shown in the uninflated and inflated configurations in FIGS. 3a and 3b, respectively. FIG. 3c shows an alternate position for the present invention. FIGS. 3a-3c show the present invention as it would be installed in a typical automobile.

Figure 4A:
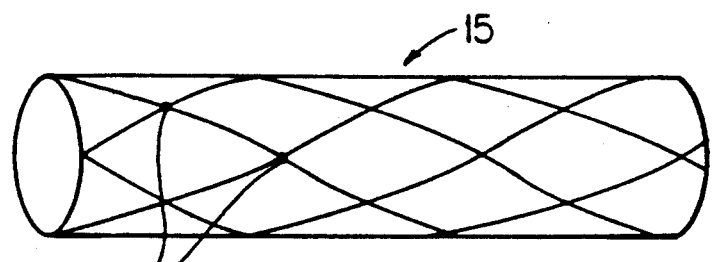
FIG. 4a shows the braided tube of the inflatable tubular structure in the uninflated state.
Figure 4B:
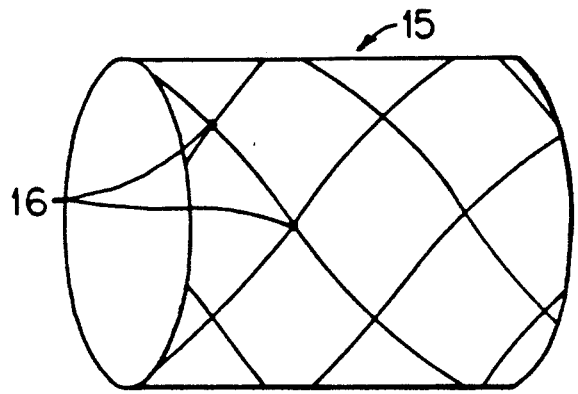
FIG. 4b shows the braided tube of the inflatable tubular structure in the inflated state.

The principal component of inflatable tubular structure 11 is braided tube 15 which is shown in detail in FIGS. 4a and 4b. Braided tube 15 is made of continuous fibers impregnated with a high elongation, air-tight elastomeric material such as silicone rubber. Typical fiber materials include, e.g., Kevlar ™, nylon, dacron and polyester fibers. In the unloaded position shown in FIG. 4a, braided tube 15 is elongated with its woven fibers forming obtuse and acute angles at the fiber crossing points 16.

When inflation begins, the tube fibers seek an orientation that allows a larger volume within the tube. FIG. 4b shows that braided tube 15 shortens in length, while its diameter increases. The braid fibers ultimately seek an orientation in which approximately 90 degree angles are formed at the fiber crossing points 16. As the tube inflates, the elastomeric material will shear and distort to accommodate the change in fiber orientation, while retaining its sealing capability. The tube diameter increases, while the tube length decreases by as much as 50%. The preferred range for decrease of the tube length is 20% to 50%. The actual range used in a specific application depends upon the geometry of the vehicle and the configuration of the tubular structure prior to and after deployment.

Upon inflation, braided tube 15 becomes a semi-rigid structure that can withstand a range of external forces. Unlike air bags which are inflated to a pressure just above one bar, the tubular structure is inflated to 3-6 bars (preferably greater than approximately 3 bars), possibly higher. The load-bearing capability of braided tube 15 depends upon a number of factors, such as tube dimension and internal pressure. The cross section may also be non-uniform in order to tailor braided tube 15 for a specific load or packaging profile.

FIGS. 3a and 3b show inflatable tubular structure 11 installed in the interior of a vehicle. The two ends of braided tube 15 are attached to A and B-pillars 20 and 21 (or to A-pillar 20 and roof rail 23, slightly aft of B-pillar 21) by pivotable mounts 18 and 19. Gas generator 22 is shown attached to braided tube 15 at the B-pillar end. However, it can be integrated at any point along or inside tube 15. FIG. 3a shows inflatable tubular structure 11 in the uninflated state. It follows the contours of A-pillar 20, roof rail 23, and B-pillar 21. The stowed structure can lay flat or be folded against the vehicle molding, or it can be integrated into the molding. Inflatable tubular structure 11 may also be concealed by a cover, such as a protective sleeve with a weak seam. Pivotable mounts 18 and 19 and gas generator 22 may also be concealed by a cover, or integrated into the vehicle molding.

As gas flows into the chamber of braided tube 15, the internal pressure increases the tube diameter and decreases the tube length. However, pivotable mounts 18 and 19 prevent the ends of the tube from moving. Thus braided tube 15 pulls itself out of its stowed position. Pivotable mounts 18 and 19 then pivot inward toward the center area of window opening 24. When tubular structure 11 is fully inflated, it deploys in a straight line between mounts 18 and 19. A typical tube 15 would have an inflated diameter of approximately 4 to 6 inches and an internal pressure of about 4 bars.

It is important to note that, in the preferred embodiment of the invention, the braided tube's "natural length" upon inflation would be less than the straight-line distance between pivotable mounts 18 and 19. Thus mounts 18 and 19 actually stretch tube 15, i.e., the tube after inflation and deployment is under tensile stress applied by mounts 18 and 19.

FIG. 3b shows tubular structure 11 in the deployed state with braided tube 15 spanning window opening 24 diagonally. Deployed tubular structure 11 forms a semi-rigid structural member between A and B-pillars 20 and 21. Tubular structure 11 prevents the occupant's head from colliding with interior vehicle components or from flailing through window opening 24, limits the intrusion of the striking or struck object, and reduces the possibility of the ejection of an unrestrained occupant through the side window. FIG. 3c shows braided tube 15 in an alternate position, with the rear end of the tube attached to the roof rail slightly behind the B-pillar. The preferred attachment position for the rear end of tubular structure 11 depends upon the configuration and geometry of a particular vehicle.

Figure 5A:
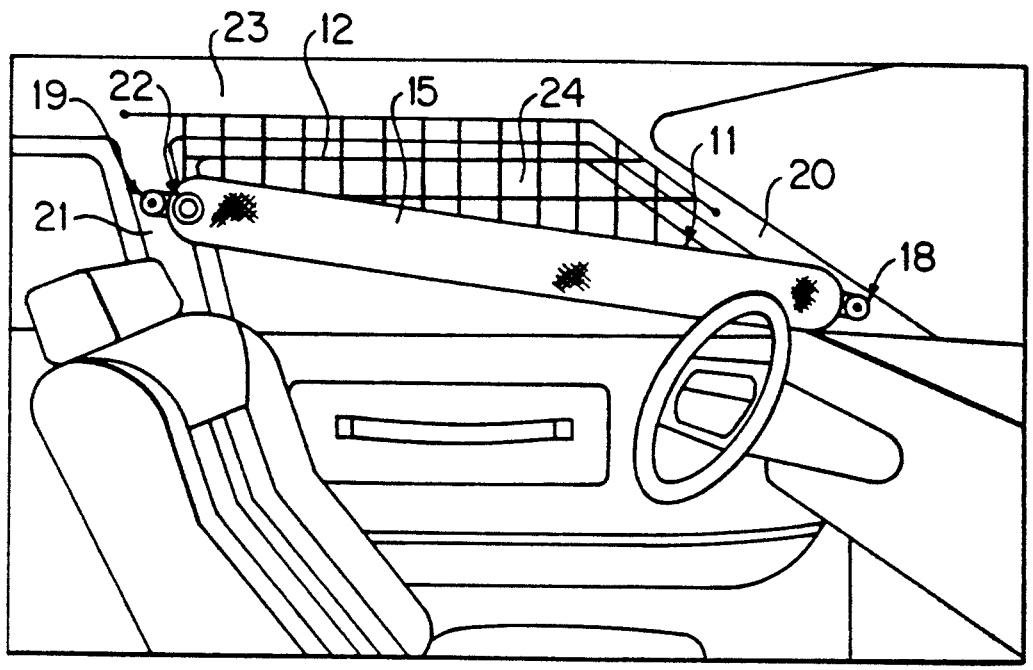
FIG. 5a shows the present invention with an optional netting feature.
Figure 5B:
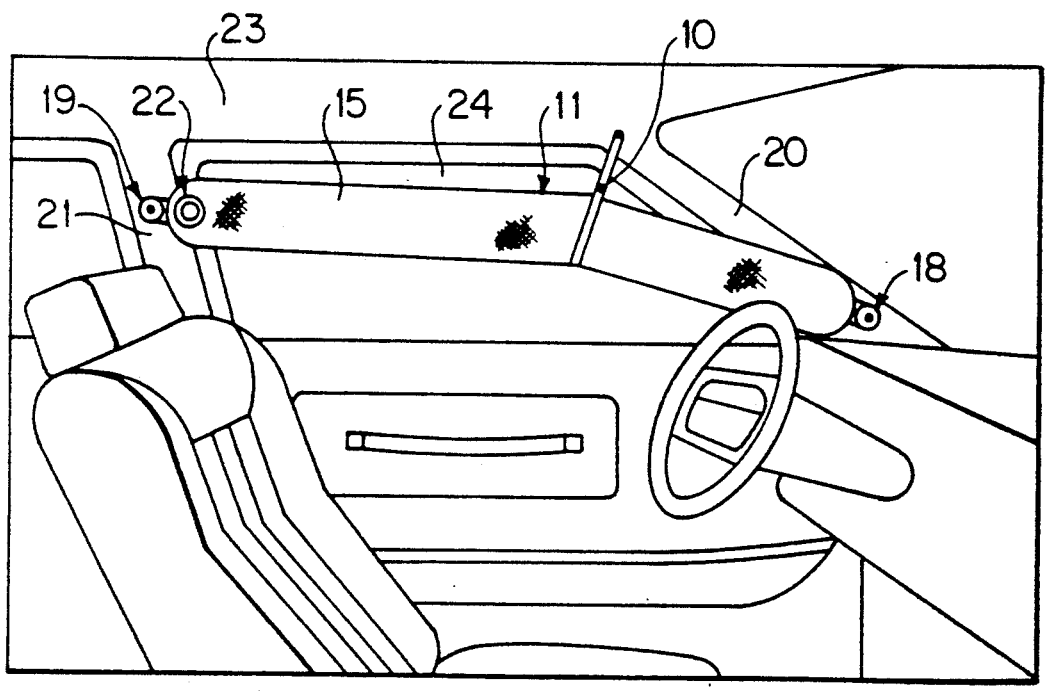
FIG. 5b shows the present invention with an optional alignment feature.

Occupant ejection could be further prevented by including optional net material 12 between roof rail 23 and tubular structure 11, as shown in FIG. 5a. The net could be attached to roof rail 23 and braided tube 15, so that it would deploy along with tubular structure 11. In the deployed position the net would provide a mesh barrier in the upper portion of the window opening between roof rail 23 and the inflated tubular structure 11. Additionally, the net could be used to modify or customize the alignment of deployed tubular structure 11. The net could hold the tube closer to the roof rail in critical head impact areas. FIG. 5b shows that tube alignment could also be modified using one or more straps 10, instead of net material 12.

Gas generator 22, shown in FIGS. 3a and 3b, is connected to a crash sensor (not shown). When the crash sensor detects an impact, it sends a signal to the initiator in gas generator 22. The initiator then ignites the generator propellant, thus producing a gas that inflates braided tube 15.

The gas generators used in the invention are preferably similar to those currently used in automotive air bags in Europe. These generators are small enough to be contained within the inflatable tube. For example, the gas generator used in the Livbag "Euroflator" air bag has a diameter of 42 mm and a length of 35 mm, and a weight of 175 grams. Gas generators preferred for this invention must fully inflate the tubular structure to pressures of approximately 4 bars within 10 to 15 milliseconds.

Unlike conventional automotive air bags, tubular structure 11 is not vented and therefore, remains sufficiently inflated to provide continuous head protection from any subsequent impacts during a crash. Additionally, since the inflatable tubular structure is inflated to 3-6 bars, it will still remain rigid even after the gas has cooled. An air bag, even unvented, will not retain its shape for more than a few hundred milliseconds due to gas cooling.

Figure 6:
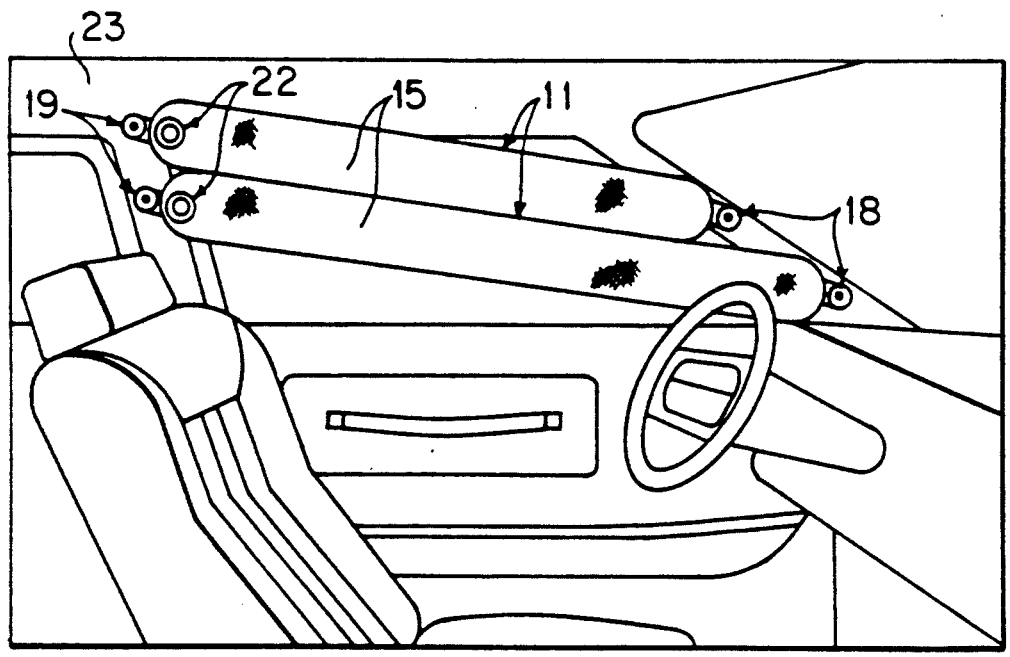
FIG. 6 shows a second preferred embodiment of the present invention with a double tubular structure.

A second preferred embodiment of the present invention is shown in FIG. 6. The second embodiment is similar to the first embodiment, but uses a pair of tubular structures instead of a single tube. The additional tube can be added slightly above the original tubular structure to provide additional protection for the head, neck and face regions. Tubular structures 11 can be separated or joined, as vehicle geometry dictates.

The foregoing disclosure of a preferred embodiment of the preferred invention has been presented for the purposes of illustration and description. It is not intended to be exhaustive or to limit the invention to the precise form disclosed. In particular, the present invention may be used as a single or multiple tube configuration. The invention can be used in land, sea or air vehicles in addition to in automobiles. For example, the present invention may be used in trains, trucks, buses, vans, boats, ships and aircraft. Many variations and modifications of the embodiments described herein will be obvious to one of ordinary skill in the art in light of the above disclosure. The scope of the invention is to be defined only by the claims appended hereto.

What is claimed is:

1. A safety system for protecting the head, neck and face of occupants in a vehicle comprising:
    (a) a tube having a first end and a second end;
    (b) the first end of the tube being pivotally mounted at a first position in the vehicle;
    (c) the second end of the tube being pivotally mounted at a second position in the vehicle;
    (d) means for generating gas in the tube;
    (e) crash sensor means connected to the means for generating gas, said crash sensor means being set to initiate generation of gas in the tube upon detecting an impact,
    wherein the tube in its uninflated state is substantially longer than the straight-line distance between the first and second positions in the vehicle,
    wherein upon inflation, the tube increases its diameter and decreases its length substantially such that:
        (i) the tube deploys under tension in a substantially straight line between the first and second positions in the vehicle, and
        (ii) the tube forms a semi-rigid member stretched in a substantially straight line from the first position in the vehicle to the second position in the vehicle.

2. The safety system of claim 1, wherein the tube is a braided tube comprising continuous fibers impregnated with a high-elongation elastomer.

3. The safety system of claim 2, wherein the length of the braided tube decreases by at least 20% upon inflation of the braided tube to a predetermined pressure.

4. The safety system of claim 3, wherein the predetermined pressure is greater than approximately 3 bars.

5. The safety system of claim 1, further comprising a net attached to the tube and to the roof rail, such that when the tube is deployed under tension in a substantially straight line from the first to the second positions in the vehicle, the net stretches from the tube to the roof rail.

6. A safety system for protecting the head, neck and face of occupants in a vehicle having a window opening and a first pillar and a second pillar on either side of the window opening comprising:
(a) a first tube having a first end and a second end;
(b) the first end of the first tube being pivotally mounted to the first pillar at a first position;
(c) the second end of the first tube being pivotally mounted to the second pillar at a second position, said first tube being stowed around a portion of the periphery of the window opening between the first pillar and the second pillar;
(d) means for generating gas in the first tube;
(e) crash sensor means connected to the means for generating gas such that when the crash sensor detects an impact, it initiates generation of gas by the means for generating gas,
wherein, upon inflation, the first tube increases its diameter and decreases its length substantially, and forms a semi-rigid member stretching under tension from the first position to the second position.

7. The safety system of claim 6, wherein the tube is a braided tube comprising continuous fibers impregnated with a high-elongation elastomer.

8. The safety system of claim 7, wherein the length of the braided tube decreases by at least 20% upon inflation of the braided tube to a predetermined pressure.

9. The safety system of claim 6, wherein said vehicle has a roof rail above said window opening, further comprising a net attached to the tube and to the roof rail, such that when the tube is deployed, the net stretches from the tube to the roof rail.

10. The safety system of claim 6, wherein upon inflation the tube is stretched between the first position and the second position.

11. The safety system of claim 6, wherein the tube remains semi-rigid after the gas generated within the tube cools.

12. The safety system of claim 6, further comprising:
(f) a second tube, said second tube having a first end and a second end, the first end of the second tube being pivotally mounted to the first pillar at a third position, the second end of the second tube being pivotally mounted to the second pillar at a fourth position, said second tube being stowed around a portion of the periphery of the window opening between the first pillar and the second pillar; and
(g) means for inflating the second tube when the crash sensor detects an impact;
wherein, upon inflation, the second tube increases its diameter and decreases its length substantially, and forms a semi-rigid member stretching under tension from the third position to the fourth position.

13. The safety system of claim 12, said means for inflating the second tube comprising a means for generating gas in the second tube connected to the crash sensor.

14. The safety system of claim 6, wherein further comprising a second tube, said second tube having a first end and a second end, the first end of the second tube being pivotally mounted to the first pillar at a third position, the second end of the second tube being pivotally mounted to the second pillar at a fourth position, said second tube being stowed around the periphery of the window opening between the first pillar and the second pillar, wherein, upon inflation, the second tube forms a semi-rigid member stretching under tension from the third position to the fourth position.

15. The safety system of claim 6, wherein the first tube is inflated at a pressure ranging from approximately 3 to approximately 6 bars.

16. A safety system for protecting occupants in a vehicle comprising:
(a) an inflatable braided tube comprising continuous fibers impregnated with a high-elongation, air-tight elastomeric material, said braided tube having a first end and a second end, the first end of said braided tube being attached to a first pillar of a vehicle, the second end of said braided tube being attached to a second pillar of said vehicle;
(b) means for generating gas within said inflatable braided tube; and
(c) means for sensing an impact connected to said means for generating gas, said means for sensing an impact being set to initiate generation of gas by the means for generating gas upon detecting an impact,
wherein said braided tube is stowed in a non-linear fashion against a surface of the vehicle between the first pillar and the second pillar, and
wherein the length of said braided tube reduces substantially upon inflation.

17. The safety system of claim 16, wherein the length of the braided tube reduces by at least 20% upon inflation of the braided tube.

18. The safety system of claim 17, wherein the length of the braided tube reduces by 20% to 50% upon inflation.

19. The safety system of claim 16, further comprising a strap attached to a roof rail of the vehicle which pulls a portion of the braided tube closer to the roof of the vehicle.

20. The safety system of claim 16, further comprising a net attached to the braided tube and to a roof rail of the vehicle.

21. A tubular structure for use as a safety device in vehicles, said tubular structure comprising:
(a) an inflatable braided tube comprising continuous fibers impregnated with a high-elongation, air-tight elastomeric material, said braided tube having a first end and a second end;
(b) pivotable mounts attached to the first and second end of the inflatable braided tube;
(c) means for generating gas within the inflatable braided tube; and
(d) means for connecting the means for generating gas to a crash sensor,
wherein the length of said braided tube reduces substantially upon inflation.

22. The tubular structure of claim 21, wherein the continuous fibers cross each other forming obtuse and acute angles when the tube is not inflated, and the continuous fibers form approximately 90 degree angles after the tube is inflated.

23. The tubular structure of claim 22, wherein upon inflation the braided tube forms a semi-rigid structure.

24. The tubular structure of claim 21, further comprising a second braided tube, wherein upon inflation said second braided tube forms a semi-rigid structure.

25. The tubular structure of claim 21, further comprising a second braided tube, said second braided tube further comprising means for generating gas and means for connecting the means for generating gas to the crash sensor.

26. A method for protecting the occupants of a vehicle from side impact collisions, comprising:
 (a) providing a braided tube pivotally mounted between a first position on a first pillar in the vehicle and a second position on a second pillar in the vehicle, said braided tube being stowed against a surface of the vehicle contiguous to the first and second pillars;
 (b) providing a gas generator within said braided tube; and
 (c) providing a crash sensor connected to said gas generator, said crash sensor being set, upon detection of an impact, to initiate generation of gas in the braided tube, thus causing the braided tube to increase in diameter and decrease in length, and deploy under tension across the shortest possible distance between the first and second positions.

* * * * *